Figure 1:
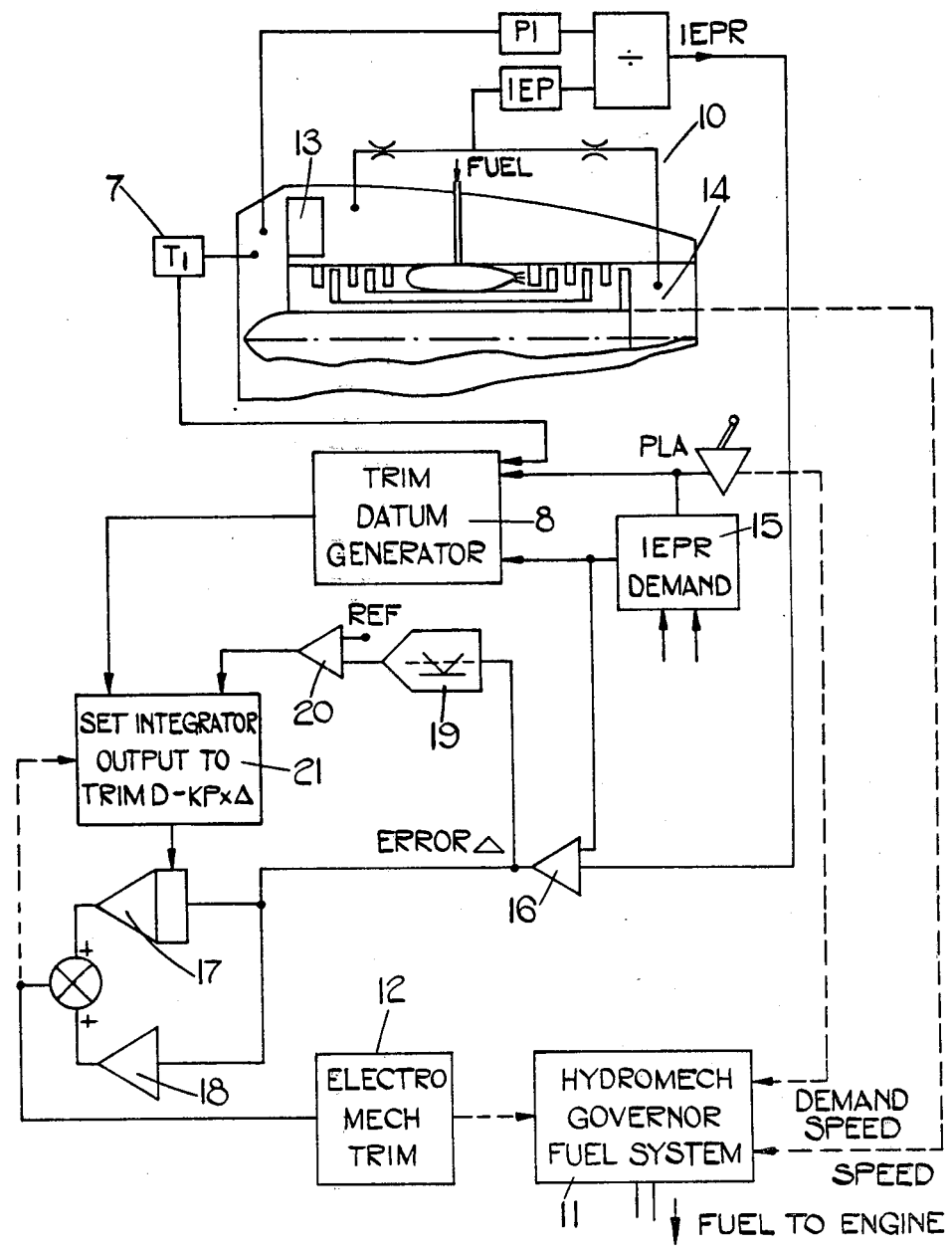

United States Patent [19]

Burrage et al.

[11] 4,380,148
[45] Apr. 19, 1983

[54] DEVICE FOR ADJUSTING GAS TURBINE ENGINE FUEL CONTROL SYSTEM IN ACCORDANCE WITH ENGINE PARAMETER

[75] Inventors: Robert G. Burrage; Michael J. Joby, both of Solihull, England

[73] Assignee: Lucas Industries Limited, Birmingham, England

[21] Appl. No.: 188,727

[22] Filed: Sep. 19, 1980

[30] Foreign Application Priority Data

Sep. 21, 1979 [GB] United Kingdom ................. 7932878

[51] Int. Cl.³ .............................................. F02C 9/28
[52] U.S. Cl. .................... 60/39.281; 60/243
[58] Field of Search ................ 60/39.28 R, 243; 364/431.02, 832; 123/352, 440, 489

[56] References Cited

U.S. PATENT DOCUMENTS

| 3,129,326 | 4/1964 | Balaban | 364/832 |
| 3,231,728 | 1/1966 | Kusto | 364/832 |
| 3,672,163 | 6/1972 | White | 60/39.28 R |
| 3,790,765 | 2/1974 | Morrison | 60/39.28 R |
| 3,839,860 | 10/1974 | Martin | 60/243 |
| 4,159,625 | 7/1979 | Kerr | 60/243 |
| 4,313,167 | 1/1982 | Brown | 364/431.02 |

Primary Examiner—L. J. Casaregola

[57] ABSTRACT

A gas turbine engine fuel control system includes an hydromechanical speed governor fuel flow control with an electromechanical trim. The trim is controlled by a proportional-plus-integral controller in accordance with the error signal from an error amplifier comparing an engine parameter with a desired value of that parameter. A trim datum signal is produced by a suitable generator circuit and, if the error signal (or its rate of charge) exceeds a set maximum, the integrator is set to a new value.

4 Claims, 3 Drawing Figures

DEVICE FOR ADJUSTING GAS TURBINE ENGINE FUEL CONTROL SYSTEM IN ACCORDANCE WITH ENGINE PARAMETER

This invention relates to a gas turbine engine fuel control system of the kind including a hydromechanical speed governor fuel control in which a fuel valve is movable (to vary fuel flow to the engine) under the influence of a control input element, operable for example by the pilot of an aircraft in which the engine is installed, and speed sensing means, the effect of said control input element on said fuel valve being variable through the intermediary of an electromechanical trim device controlled by an electronic control circuit sensitive to at least one engine parameter.

With a control system of this kind problems arise with overshoot which occurs following a step change in the control input. It is an object of the present invention to provide a fuel control system of the kind specified in which such overshoot is avoided.

In accordance with the invention there is provided a fuel control system of the kind specified in which the electronic control circuit controlling the electromechanical trim device includes error signal generating means for producing an error signal representing the difference between the desired and actual values of said engine parameter, a proportional-plus-integral controller circuit for producing the output signal which is applied to said electromechanical trim device, means for generating a trim datum signal dependent on the control input and means for setting the integrator included in the proportional-plus-integral control circuit to a value corresponding to the difference between the trim datum signal and the output of the proportional part of the proportional-plus-integral control circuit when the magnitude of the output of the error signal generating circuit or the rate of change of such output exceeds a predetermined value.

Figure 2:
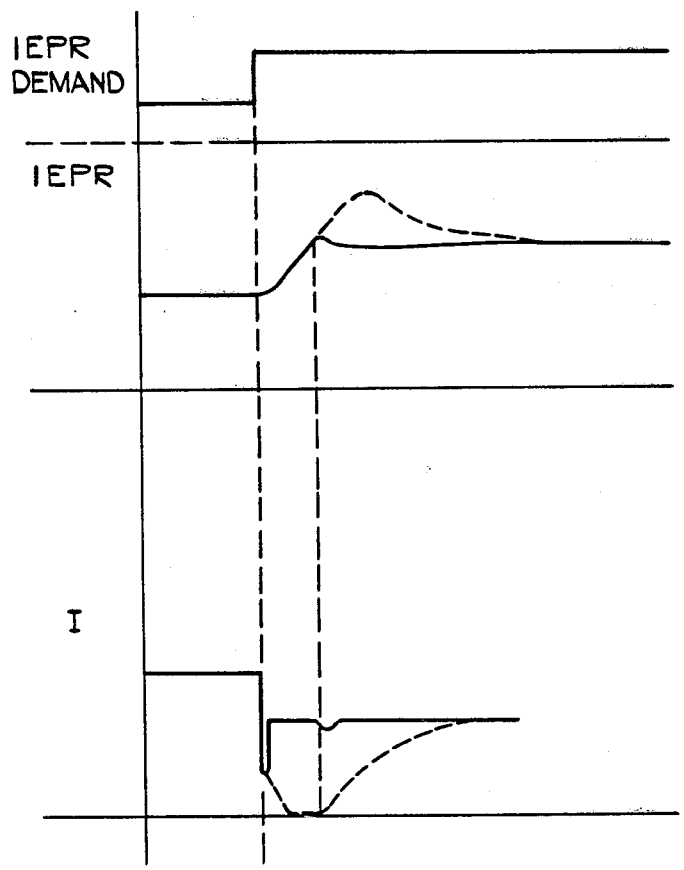
Figure 3:
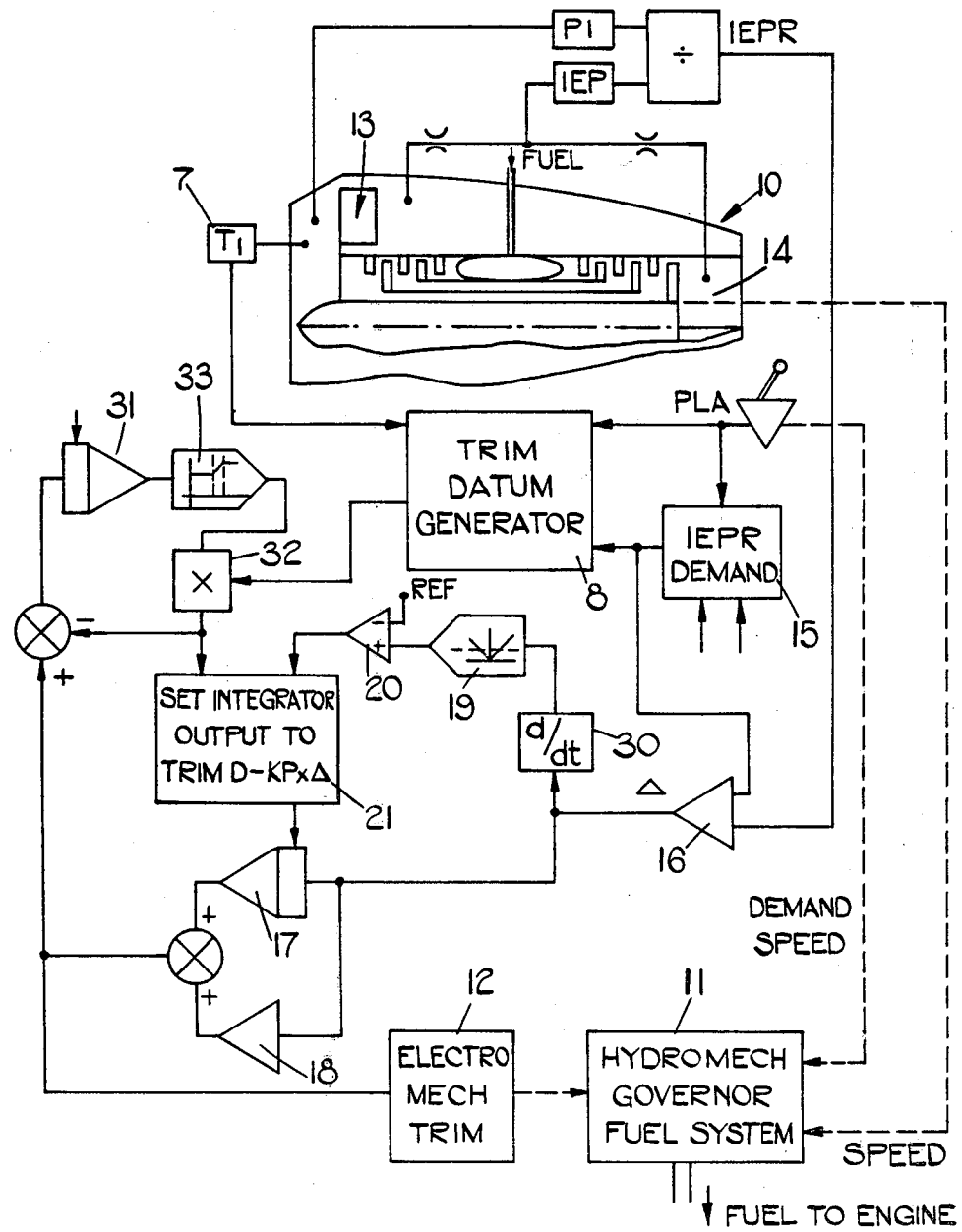

In the accompanying drawings, FIG. 1, is a diagram of one example of the invention, FIG. 2 is a series of graphs illustrating the performance of the control shown in FIG. 1 and FIG. 3 is a diagram of a modified form of the invention.

The system described is intended to control the fuel flow to a ducted fan type gas turbine engine 10. The fuel control itself is a hydromechanical system 11 as described in detail in U.K. Patent Specification No. 1465477 and will not be described in detail herein, the present invention being concerned with the generation of an electrical signal to control an electromechanical trim element 12 in the form of a torque motor providing a mechanical trim input to the system 11.

The trim signal generating circuit utilizes an input signal dependent on the engine parameter known as the integrated exhaust pressure ratio (IEPR), which is derived by dividing an electrical signal representing the integrated exhaust pressure (IEP), being a pressure at the tapping of an air potentiometer connected between one pressure tapping downstream of the fan 13 of the engine and another pressure tapping at the outlet 14 of the core engine, by an electrical signal representing the pressure in the engine air intake upstream of the fan 13.

An IEPR demand signal generator 15 is provided to calculate the desired value of the IEPR signal for any given position of the pilots lever PLA (with other engine variables as additional inputs to this generator).

The actual IEPR signal and the IEPR demand signal are applied to an error signal generator 16, the error signal output of which is applied to the inputs of an integrator 17 and a linear amplifier 18, the outputs of which are added together to generate the trim signal which is applied to the trim element 12.

The PLA signal is also supplied along with signals from the IEPR demand signal generator 15 and from a temperature transducer 7 sensitive to the air intake temperature, to a trim datum signal generator 8. This generator 8 calculates a trim datum signal by dividing a signal representing the difference between a permitted maximum high pressure spool speed at the existing PLA setting and a permitted minimum speed at that setting by a calculated desired speed signal derived by multiplying a function of IEPR demand by a function of the temperature signal.

The trim datum signal is not used during normal steady state running of the engine, since the closed loop, incorporating the error generator 16, the integrator 17 and the proportional amplifier 18 normally maintains the error signal at zero. Following a rapid change in PLA, however, there will be a step change in the IEPR demand signal and the effect of integrator 17 will be to cause the trim element 12 to be driven to one or other of its extremes whilst engine acceleration (or deceleration) is being controlled by other means (not shown in the drawing). This will result in a large overshoot at the end of acceleration or deceleration.

To prevent this overshoot, the error signal is connected via an absolute value circuit 19 to a reference comparator 20 connected to operate an integrator setting circuit 21 which causes the integrator output to take up a level such that the sum of its output and that of the amplifier 18 is equal to the trim datum signal whenever the magnitude of error signal exceeds the reference level. Thus, in acceleration or deceleration, when the output of error signal generator 16 is large, the integrator 17 will be prevented from integrating the error signal and the trim element will be set in the position it will be expected to take up after acceleration or deceleration is completed. When the error signal falls below the reference level integrator 17 will start integrating again and whilst a small overshoot will occur this will be trivial compared with the overshoot which would occur in the absence of the integrator setting circuit.

In FIG. 2, the upper graph shows a step change in the IEPR demand and the solid lines in the middle and lower graphs show how the actual IEPR and the current supplied to the trim element 12 vary with time following the step change. The dotted lines show the performance without the reset circuit 21 operating.

It will be appreciated that, although the invention has been illustrated in terms of analog controls, a digital control involving a suitably programmed computer or a microprocessor could also be employed.

Turning now to FIG. 3, there are two main areas of difference. Firstly, a differentiator 30 is interposed between the error signal generator 16 and the absolute value circuit 19. The effect of this modification is to cause the integrator 17 output to be set as previously described when the absolute value of the rate of change of the error signal exceeds a set threshold, rather than when the absolute value of the error signal exceeds that threshold. The result of this is that there is no danger of a steady state latch-up condition occurring. In the original circuit latch-up could occur if the effect of imposing the trim was to cause the error to remain above the threshold. With the differentiator 30 inserted the integrator 17 is externally set only during transient conditions and once the error has stabilised the normal integral and proportional trim loop is re-established.

The other change as compared with the original circuit is provision of a closed loop determining the value of the constant K. This loop includes an integrator 31 connected to integrate the difference between the output of the summing junction between the integrator 17 and ampifier 18 and the output of a multiplier 32. The output of integrator 31 is supplied to a function generator 33 the characteristic of which is as shown in the diagram—i.e. its output its constant and positive when the integrator output is low, constant and larger when the integrator output is high, and linearly varying between these two constant values for intermediate values of the integrator output. The multiplier 32 has one input from the trim datum generator 8 and another from the function generator 33 and its output is applied to the integrator setting circuit 21.

This closed loop operates so that in steady conditions the output of multiplier 32 is equal to the output of the integrator 17 (the output of amplifier 16 being zero in these conditions). Whenever a change occurs which necessitates setting integrator 17, changes in the output of the trim datum generator occur more quickly than changes in the output of integrator 31, so that the multiplier K value set during the previous steady state condition is used to multiply the new trim datum signal. The two constant levels of the output of the function generator 33 determine limits to the value of K which are respectively lower and higher than the normal range of values which K will adopt during steady state conditions, but the value of the output of the integrator 31 during large change transient conditions will cause these limits to be reached. In these conditions there is no point in attempting to maintain the value of K "correct" because until steady state is again reached the necessary value of K cannot be accurately predicted.

We claim:

1. A fuel control system for a gas turbine engine of the kind including a hydromechanical speed governor fuel control in which a fuel valve is movable under the influence of a control input element, operable for example by the pilot of an aircraft in which the engine is installed, and speed sensing means, the effect of said control input element on said fuel valve being variable through the intermediary of an electromechanical trim device controlled by an electronic control circuit sensitive to at least one engine parameter, wherein said electronic control circuit includes error signal generating means for producing an error signal representing the difference between the desired and actual values of said engine parameter, a proportional-plus-integral controller circuit for producing the output signal which is applied to said electromechanical trim device, means for generating a trim datum signal dependent on the control input and means for setting the integrator included in the proportional-plus-integral control circuit to a value corresponding to the difference between the trim datum signal and the output of the proportional part of the proportional-plus-integral control circuit when the magnitude of a function of the error signal exceeds a predetermined value.

2. A fuel control system as claimed in claim 1 including a closed loop circuit including a multiplier, a further integrator connected to integrate the difference between the output of the proportional-plus-integral circuit and the output of said multiplier, one input of the multiplier being connected to the output of said trim datum signal generating means and a function generator having an input connected to the output of said further integrator and its output connected to the other input of the multiplier, said function generator producing a relatively low level constant signal at low values of the output of the further integrator and a relatively high level constant signal at high values of the output of the further integrator, and the output of the multiplier being connected to an integrator setting circuit controlled by a comparator sensitive to the rate of change of the output of the error signal generating circuit.

3. A fuel control system as claimed in claim 1, wherein the function of the error signal is the error signal itself.

4. A fuel control system as claimed in claim 1, wherein the function of the error signal is the rate of change of the error signal.

* * * * *